US011721150B2

(12) United States Patent
Nagata et al.

(10) Patent No.: US 11,721,150 B2
(45) Date of Patent: Aug. 8, 2023

(54) INFORMATION PROCESSING APPARATUS, INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventors: Yu Nagata, Chofu (JP); Shin Sakurada, Toyota (JP); Satoshi Komamine, Nagoya (JP); Yusuke Sato, Nagoya (JP); Hiromitsu Fujii, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/495,135

(22) Filed: Oct. 6, 2021

(65) Prior Publication Data

US 2022/0114852 A1 Apr. 14, 2022

(30) Foreign Application Priority Data

Oct. 8, 2020 (JP) ................................ 2020-170782

(51) Int. Cl.
*G07C 9/22* (2020.01)
*G07C 9/00* (2020.01)
*G06V 20/13* (2022.01)

(52) U.S. Cl.
CPC .............. *G07C 9/22* (2020.01); *G06V 20/13* (2022.01); *G07C 9/00309* (2013.01)

(58) Field of Classification Search
CPC .. G07C 9/00309; G07C 9/22; G07C 9/00174; G07C 9/20; G07C 9/38; G07C 2009/00277; G06V 20/13
See application file for complete search history.

(56) References Cited

U.S. PATENT DOCUMENTS

| | | | | |
|---|---|---|---|---|
| 4,994,722 A | * | 2/1991 | Dolan | E05B 47/00 340/565 |
| 6,237,872 B1 | * | 5/2001 | Bar-Levav | B64D 11/0601 105/340 |
| 6,329,919 B1 | * | 12/2001 | Boies | G06Q 10/02 705/5 |
| 10,068,403 B1 | * | 9/2018 | McGehee | G02B 27/017 |
| 11,602,033 B1 | * | 3/2023 | Siminoff | H05B 47/11 |
| 2002/0022896 A1 | * | 2/2002 | Dugan | G08B 5/221 700/83 |
| 2007/0241927 A1 | * | 10/2007 | Ratnakar | G06Q 10/025 244/118.6 |
| 2009/0300988 A1 | * | 12/2009 | Bem | E05B 65/0035 70/101 |

(Continued)

FOREIGN PATENT DOCUMENTS

JP 2003233740 A * 8/2003
JP 2010-213828 A 9/2010

*Primary Examiner* — Daniel I Walsh
(74) *Attorney, Agent, or Firm* — Dinsmore & Shohl LLP

(57) ABSTRACT

An information processing apparatus disclosed has a controller. The controller forecasts whether an intended user will go to a restroom area in a facility. The intended user being a user who is eligible for using a multipurpose restroom stall. When it is forecast that the intended user will go to the restroom area, the controller reserves a multipurpose restroom stall provided in the restroom area by locking the door of the multipurpose restroom stall.

14 Claims, 7 Drawing Sheets

(56) References Cited

U.S. PATENT DOCUMENTS

| | | | | |
|---|---|---|---|---|
| 2012/0237188 | A1* | 9/2012 | Wang | H04N 5/765 |
| | | | | 386/326 |
| 2014/0196372 | A1* | 7/2014 | Boren | E05F 15/73 |
| | | | | 49/31 |
| 2014/0354880 | A1* | 12/2014 | Han | H04N 23/51 |
| | | | | 348/376 |
| 2015/0177917 | A1* | 6/2015 | Hoekstra | G06Q 10/10 |
| | | | | 715/771 |
| 2015/0308091 | A1* | 10/2015 | Foust | E03D 11/12 |
| | | | | 4/310 |
| 2017/0027131 | A1* | 2/2017 | Brownridge | A01K 1/0076 |
| 2018/0060800 | A1* | 3/2018 | Robinson | G07C 9/00182 |
| 2018/0285785 | A1* | 10/2018 | Smith | B64D 11/02 |
| 2019/0128046 | A1* | 5/2019 | Tokuchi | G05B 15/02 |
| 2019/0130688 | A1* | 5/2019 | Tokuchi | G07C 9/00309 |
| 2020/0077243 | A1* | 3/2020 | Heller | G07F 9/001 |
| 2020/0094779 | A1* | 3/2020 | Hiruta | B60R 25/24 |
| 2020/0097018 | A1* | 3/2020 | Muramatsu | G05D 1/0225 |
| 2020/0117156 | A1* | 4/2020 | Guan | G05B 19/048 |
| 2020/0407954 | A1* | 12/2020 | Grimaldi | E03C 1/01 |
| 2021/0019669 | A1* | 1/2021 | Miyazaki | G06Q 10/02 |
| 2021/0333699 | A1* | 10/2021 | Peel | G06F 3/0421 |
| 2022/0114852 | A1* | 4/2022 | Nagata | G06V 20/13 |
| 2022/0147883 | A1* | 5/2022 | Tokuchi | G06Q 10/109 |
| 2022/0301413 | A1* | 9/2022 | Sinha | H04W 4/80 |
| 2022/0343413 | A1* | 10/2022 | Hoh | G06Q 30/0201 |
| 2022/0370668 | A1* | 11/2022 | Moton, Jr. | G07F 17/12 |
| 2023/0024957 | A1* | 1/2023 | Chou | G07C 9/00904 |
| 2023/0060626 | A1* | 3/2023 | Stevens | E04H 1/1216 |

\* cited by examiner

[Fig. 1]
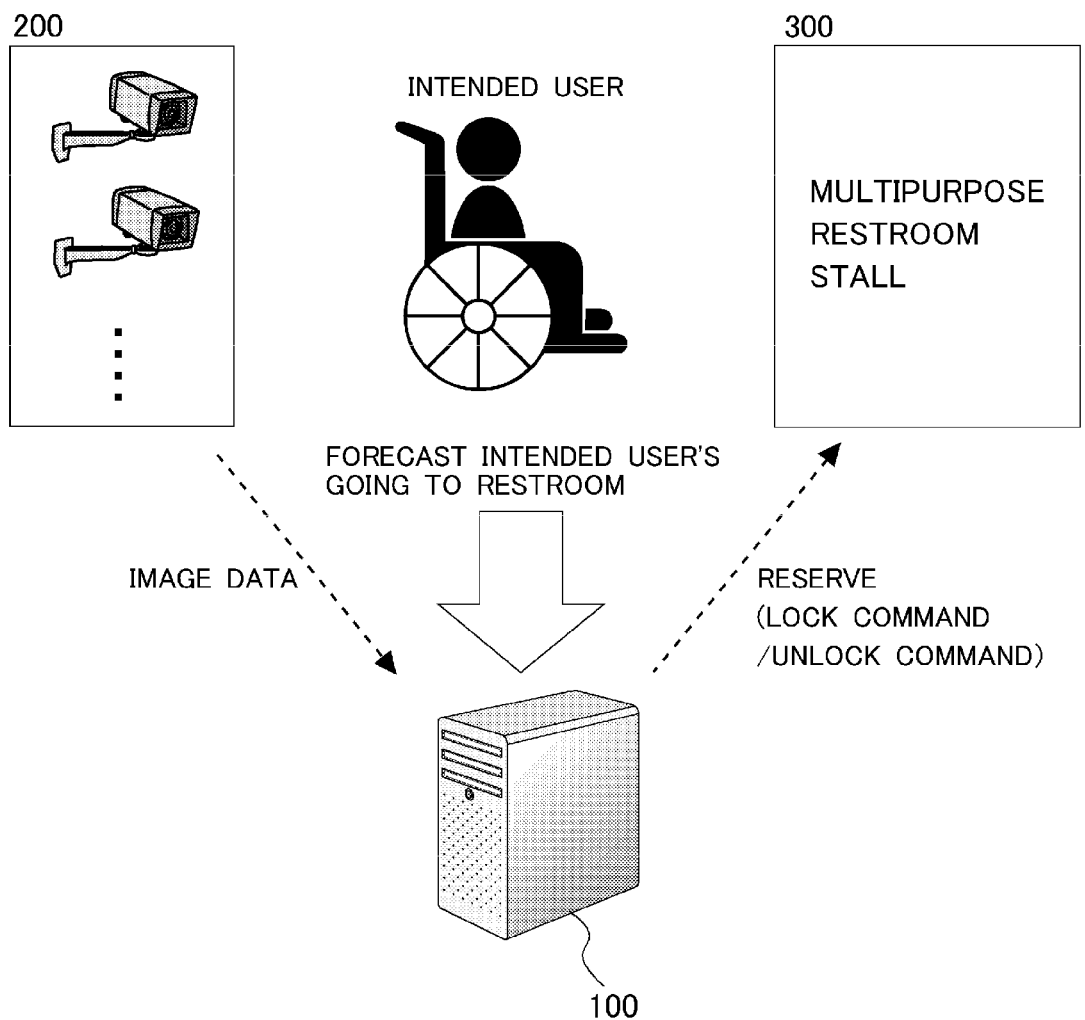

[Fig. 2]
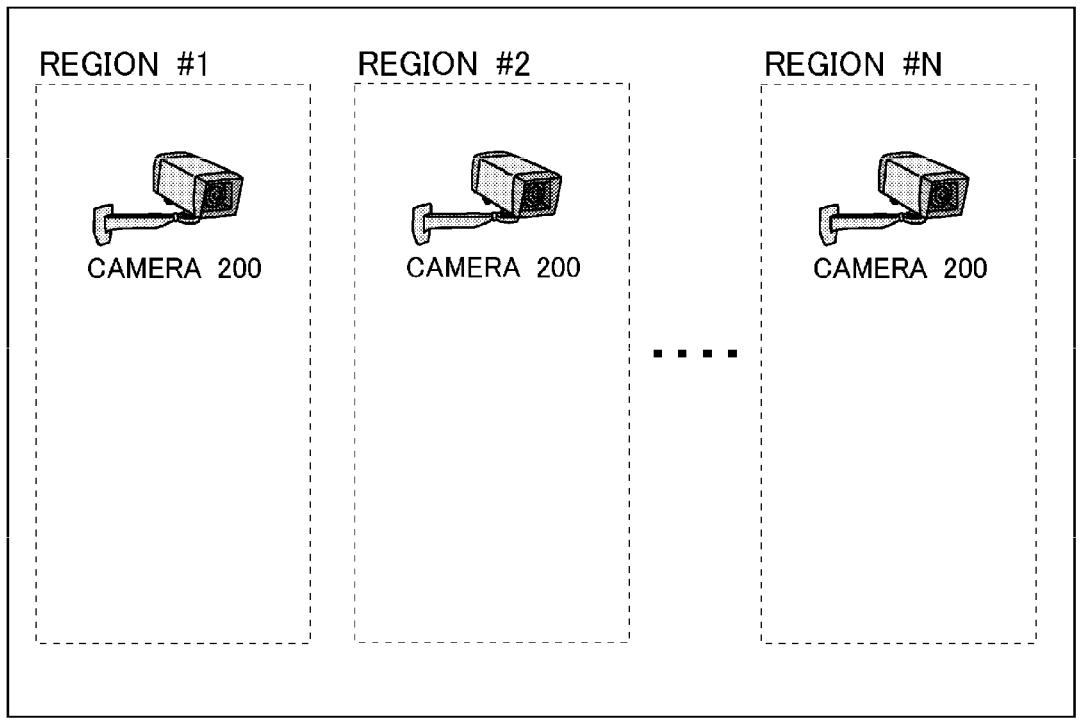

[Fig. 3]
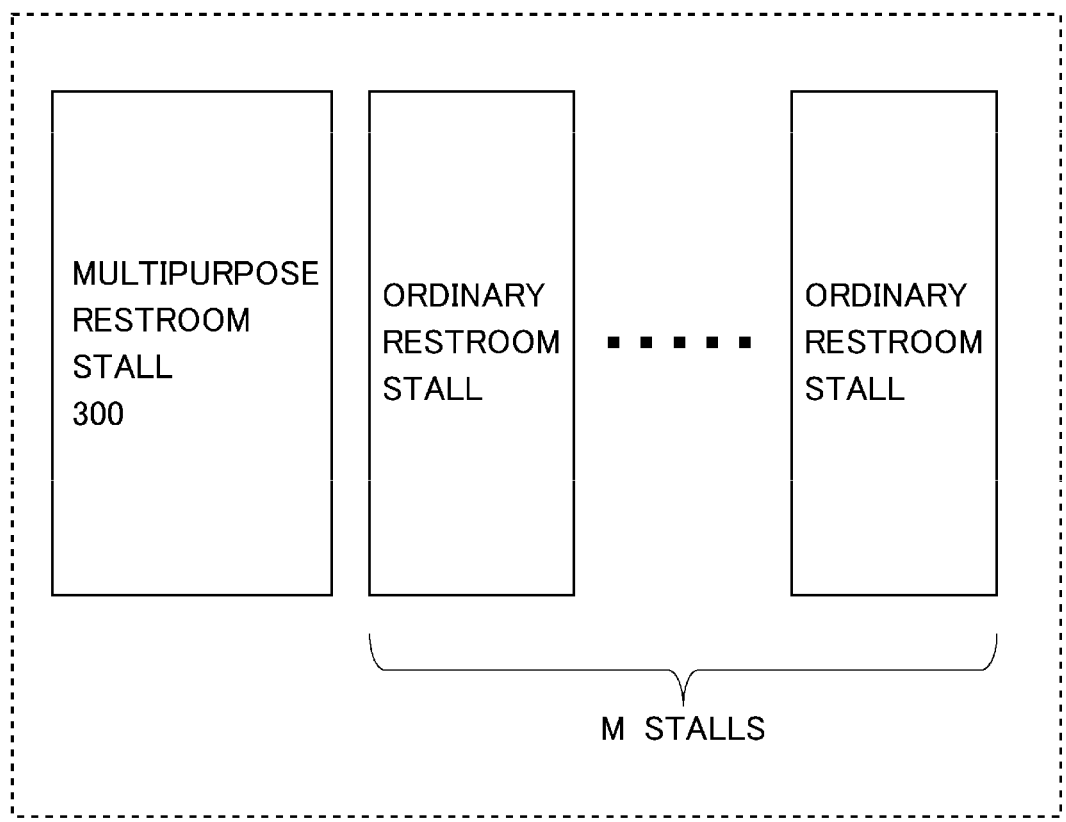

[Fig. 4]
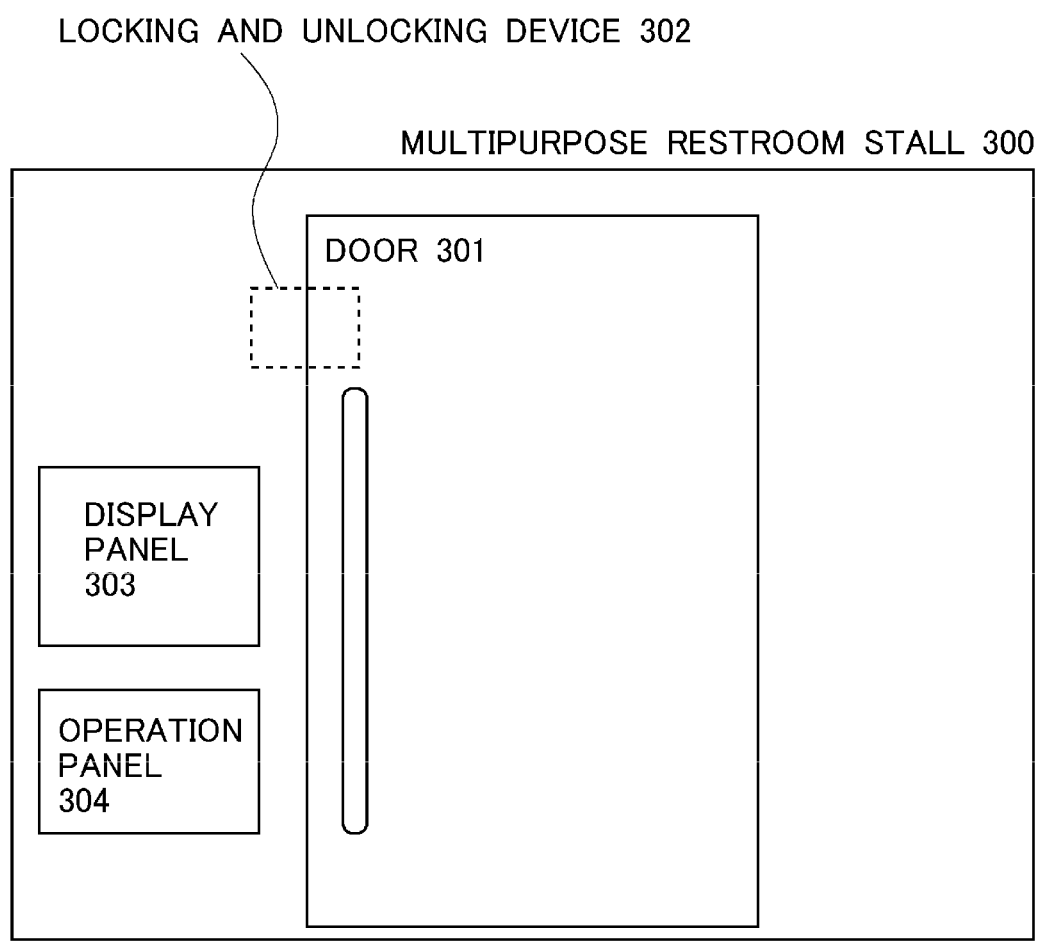

[Fig. 5]
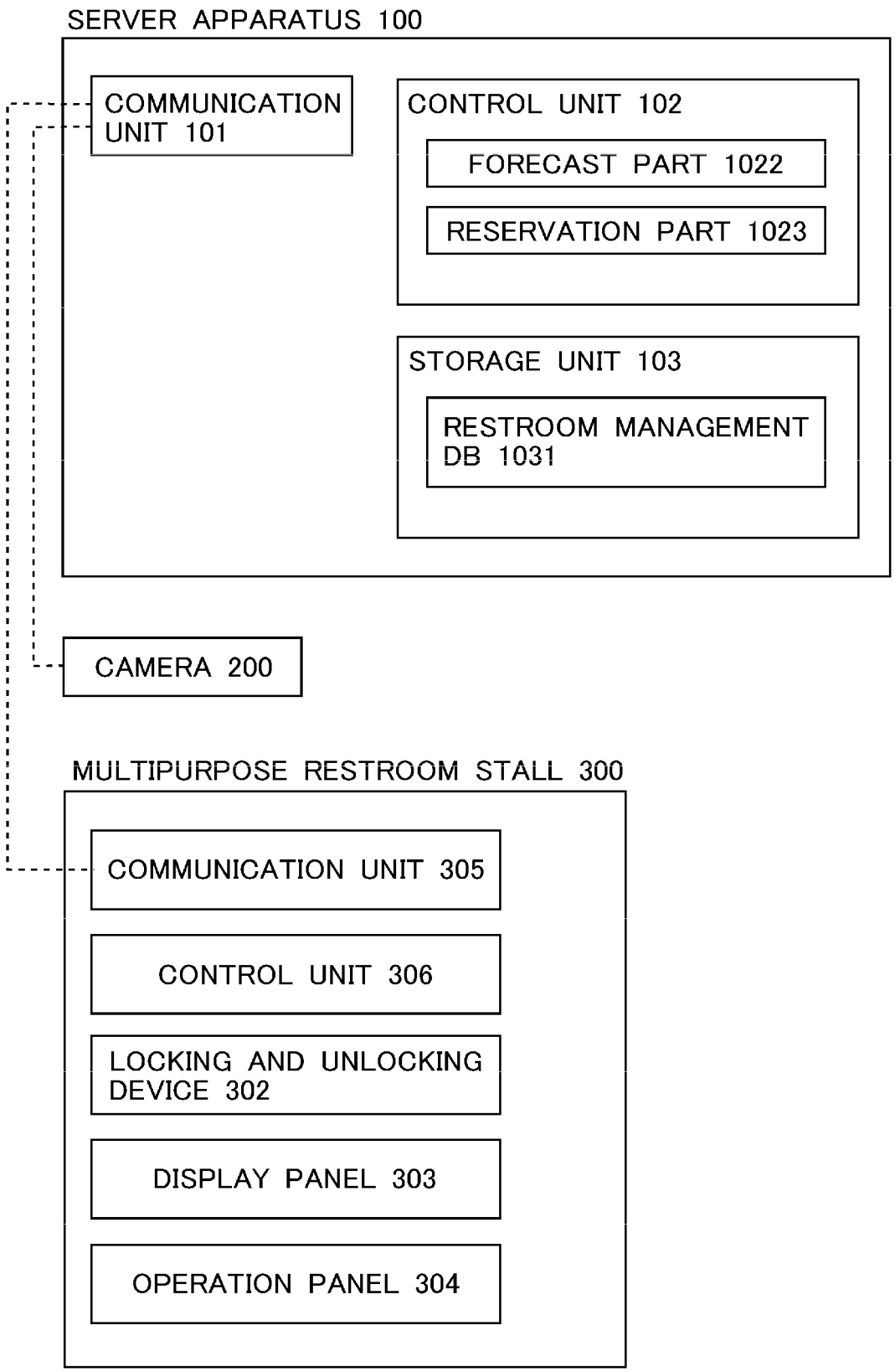

[Fig. 6]

| AREA ID | MULTIPURPOSE RESTROOM STALL | ORDINARY RESTROOM STALL #1 | | ORDINARY RESTROOM STALL #M |
|---|---|---|---|---|
| T00001 | VACANT | OCCUPIED | ..... | VACANT |
| T00002 | RESERVED | VACANT | ..... | VACANT |
| T00003 | OCCUPIED | OCCUPIED | ..... | OCCUPIED |
| ⋮ | ⋮ | ⋮ | | ⋮ |

[Fig. 7]

| MULTIPURPOSE RESTROOM STALL | ORDINARY RESTROOM STALL #1 | | ORDINARY RESTROOM STALL #M |
|---|---|---|---|
| VACANT | OCCUPIED | ..... | VACANT |

[Fig. 8]
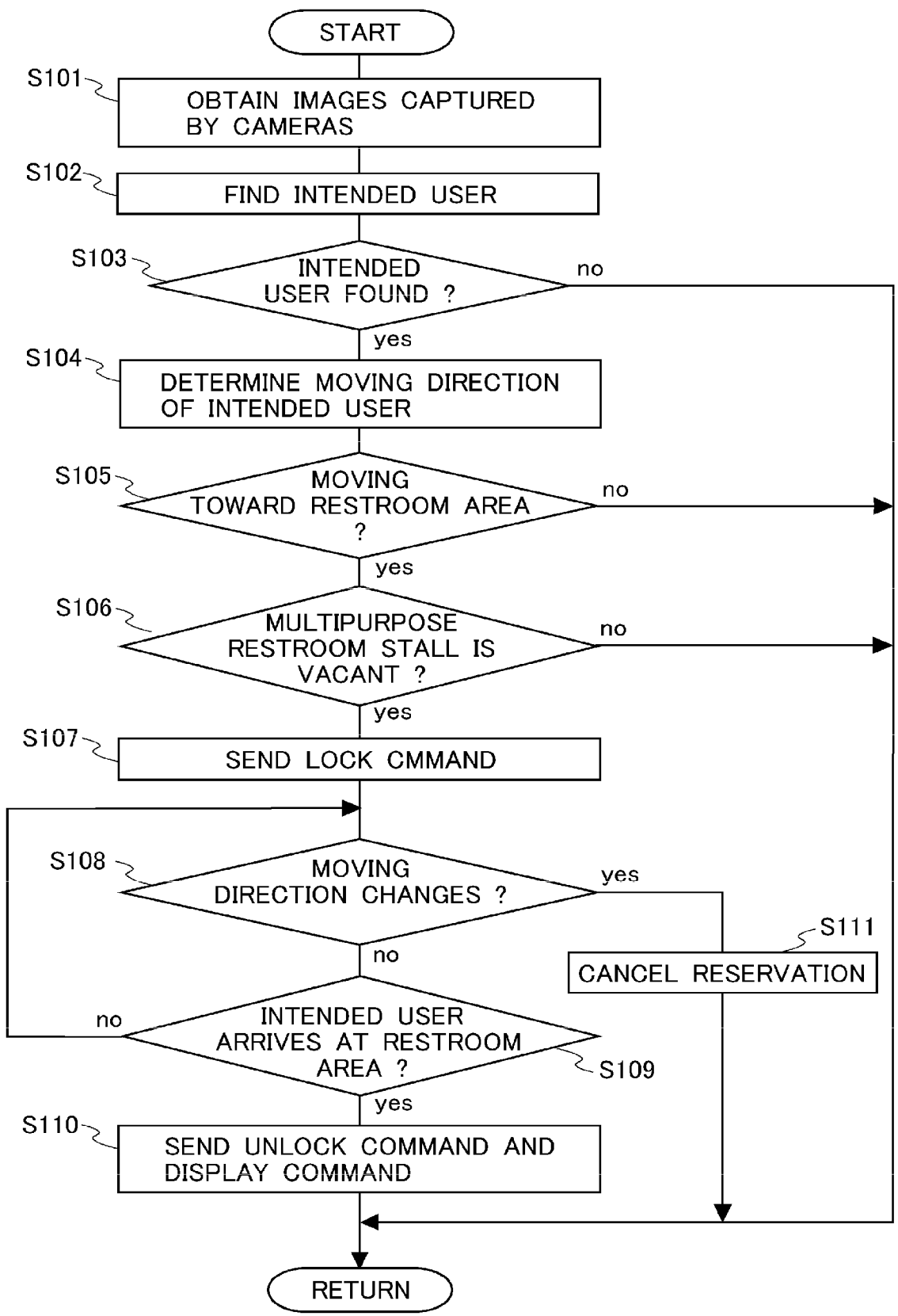

INFORMATION PROCESSING APPARATUS, INFORMATION PROCESSING METHOD, AND NON-TRANSITORY STORAGE MEDIUM

CROSS-REFERENCE TO RELATED APPLICATIONS

This application claims the benefit of Japanese Patent Application No. 2020-170782, filed on Oct. 8, 2020, which is hereby incorporated by reference herein in its entirety.

BACKGROUND

Technical Field

The present disclosure relates to an information processing apparatus, an information processing method, and a non-transitory storage medium.

Description of the Related Art

There has been developed a technology for assisting a patient in a hospital or other place in making a reservation for use of a restroom and moving thereto to urinate or defecate by an autonomously movable robot. (see, for example, Patent Literature 1 in the citation list below).

CITATION LIST

Patent Literature

Patent Literature 1: Japanese Patent Application Laid-Open No. 2010-213828

SUMMARY

An object of this disclosure is to provide a technology that can improve the convenience of use of a multipurpose restroom stall.

Disclosed herein is an information processing apparatus for managing a restroom stall in a facility. The information processing apparatus may comprise, for example, a controller including at least one processor, the controller being configured to execute the processing of:

forecasting whether an intended user will go to a restroom area in a facility, the intended user being a user who is eligible for using a multipurpose restroom stall; and when it is forecast that the intended user will go to the restroom area, reserving a multipurpose restroom stall provided in the restroom area.

Also disclosed herein is an information processing method for managing a restroom stall in a facility. The information processing method may comprise, for example, the following steps of processing executed by a computer:

a first step of forecasting whether an intended user will go to a restroom area in a facility, the intended user being a user who is eligible for using a multipurpose restroom stall; and when it is forecast that the intended user will go to the restroom area, a second step of reserving a multipurpose restroom stall provided in the restroom area.

Also disclosed herein is an information processing program that causes a computer to implement the above-described information processing method and a non-transitory storage medium in which this information processing program is stored in a computer-readable manner. There is also provided an information processing system including a restroom stall provided in a facility and the above-described information processing apparatus.

This disclosure can provide a technology that can improve the convenience of use a multipurpose restroom.

BRIEF DESCRIPTION OF DRAWINGS

FIG. 1 is a diagram illustrating the general configuration of a restroom management system according to an embodiment.

FIG. 2 is a diagram illustrating an exemplary arrangement of cameras in a facility.

FIG. 3 illustrates an exemplary arrangement of a multipurpose restroom stall and ordinary restroom stalls in a restroom area.

FIG. 4 is a front view of the multipurpose restroom stall.

FIG. 5 is a block diagram illustrating exemplary configurations of a server apparatus and the multipurpose restroom stall.

FIG. 6 illustrates an exemplary structure of a restroom information table.

FIG. 7 illustrates an exemplary structure of another restroom information table.

FIG. 8 is a flow chart of a process performed by a server apparatus.

DESCRIPTION OF EMBODIMENTS

The provision of multipurpose restroom stalls has been increasing in many public facilities. Here, the term "multipurpose restroom stall" refers to a restroom stall that has a space and equipment adapted to intended users. The multipurpose restroom is also called "multifunctional restroom stall", "accessible restroom stall", or "restroom stall for everyone". The intended users are users who have some difficulties in using ordinary restroom stalls. Examples of such users include users in a wheelchair, users using a cane, users accompanied by an infant, pregnant users, aged users, and handicapped users.

An area of a public facility or the like in which toilets are provided generally has a plurality of restroom stalls including ordinary restroom stalls as well as multipurpose restroom stalls mentioned above. Such an area will be hereinafter referred to as "restroom area". The ordinary restroom stall refers to a restroom stall for able-bodied persons, which can be inconvenient or difficult for the aforementioned intended users of the multipurpose restroom stall to use.

Multipurpose restroom stalls tend to have larger areas and require larger construction costs than ordinary restroom stalls. Therefore, the number of multipurpose restroom stalls provided in a restroom area tends to be smaller than the number of ordinary restroom stalls. In such circumstances, if multipurpose restroom stalls are used by users who can use ordinary restroom stalls without difficulties (e.g. able-bodied users), there may arise a situation in which an intended user cannot use a multipurpose restroom stall. Therefore, improvement of the convenience of use of multipurpose restroom stalls is desired.

The information processing apparatus disclosed herein has a controller that is configured to forecast whether an intended user will go to a restroom area in a facility. For example, the controller may forecast whether the intended user will go to a restroom area on the basis of location information of the intended user (i.e. information about the location of the intended user). Alternatively, the controller may forecast whether the intended user will go to a restroom area using an image captured by a camera configured to capture images in the facility. Still alternatively, the controller may forecast whether the intended user will go to a restroom area using sound picked up by a sound pickup device configured to pick up sound in the facility. In the process of forecasting whether the intended user will go to a restroom area in such ways, the controller may identify a user as an intended user using an image captured by a camera configured to capture images in the facility. Alternatively, the controller may calculate the speed of movement of each user on the basis of location information of each user and identify a user whose calculated speed of movement is lower than a certain threshold as an intended user. Alternatively, the controller may determine a path of movement of each user on the basis of location information of each user and identify a user whose path of movement determined includes a slope but does not include stairs as an intended user.

If it is forecast that the intended user will go to a restroom area in the facility, the controller reserves a multipurpose restroom stall in the restroom area. For example, the controller locks the door of the multipurpose restroom stall to reserve it. Moreover, when the intended user comes near the multipurpose restroom stall, the controller may unlock the door of the multipurpose restroom stall. This can prevent other users from starting to use the multipurpose restroom stall while the intended user moves to the restroom area. Consequently, the intended user can use the multipurpose restroom stall immediately when he or she arrives at the restroom area.

If the locked door of the multipurpose restroom stall is unlocked when the intended user comes near, the intended user may mistakenly believe that another user has been using the stall. In other words, the intended user may mistakenly believe that another user is still staying in the stall. Then, the intended user may abstain from immediately using this multipurpose restroom stall. To prevent from such a situation from occurring, the controller may further execute a processing for inviting the intended user to use the multipurpose restroom stall, when unlocking its door. For example, the controller may cause an output device provided for the multipurpose restroom stall to output a voice message that invites the intended user to use the multipurpose restroom stall. Alternatively, the controller may cause an output device provided for the multipurpose restroom stall to output an image (including text and/or illustration) that invites the intended user to use the multipurpose restroom stall. This can prevent the above-described misunderstanding by the intended user. In consequence, the intended user can use the multipurpose restroom stall immediately when its door is unlocked.

When the restroom stalls in the restroom area other than the multipurpose restroom stalls are all occupied, the controller may abstain from reserving a multipurpose restroom stall. Then, other users who have urgent need to urinate or defecate will not be prevented from using a multipurpose restroom stall, when the restroom area is crowded.

EMBODIMENT

In the following, a specific embodiment of the technology disclosed herein will be described with reference to the drawings. It should be understood that the dimensions, materials, shapes, relative arrangements, and other features of the components that will be described in connection with the embodiment are not intended to limit the technical scope of this disclosure only to them, unless otherwise stated.

What is described in the following as an embodiment is a case where the technology disclosed herein is applied to a system that manages a restroom provided in a public facility, such as a shopping mall, an amusement facility, or a train station. This system will be hereinafter referred to as "restroom management system".

(General Configuration of Restroom Management System)

FIG. 1 is a diagram illustrating the restroom management system according to the embodiment. The restroom management system of this embodiment includes a server apparatus 100, cameras 200, and a multipurpose restroom stall 300.

The cameras 200 are surveillance cameras configured to capture images of places in a facility where users can enter or stay. In the case of this embodiment, the area in the facility where users can enter or stay is divided into N regions (or regions #1 to #N), and at least one camera 200 is provided for each region. The size and the shape of each of the regions #1 to #N may be determined in such a way that an image of the entirety of each region can be captured by one camera. A plurality of cameras having different image-capturing angles or image-capturing locations may be provided in each region. The images captured by the cameras 200 may be sent to the server apparatus 100 either on the real time basis or at certain intervals (e.g. several seconds or several tens seconds).

The multipurpose restroom stall 300 is provided in a restroom area in the facility. As illustrated in FIG. 3, the restroom area is an area where the multipurpose restroom stall 300 and ordinary restroom stalls are provided. The multipurpose restroom stall 300 is a restroom stall provided with a space and equipment that intended users can use fitly. The intended users are users who may have some difficulties in using ordinary restroom stalls. Examples of the intended users include users in a wheelchair, users using a cane, users accompanied by an infant, pregnant users, aged users, and handicapped users. The ordinary restroom stall refers to a restroom stall for able-bodied persons, which can be inconvenient or difficult for the intended users to use. While only one multiple restroom stall 300 and M ordinary restroom stalls are provided in the restroom area in the exemplary case illustrated in FIG. 3, the number of multipurpose restroom stalls 300 and the number of ordinary restroom stalls provided in the restroom area are not limited to those in the case illustrated in FIG. 3.

The multipurpose restroom stall 300 has a space that allows a wheelchair to be turned, a toilet bowl provided with a handrail (handrails), and a hand wash basin provided with a handrail (handrails) In addition to the above space and equipment, the multipurpose restroom stall may be provided with other equipment, such as a seat on which an infant is to seat, a platform on which replacement of diaper of an infant can be carried out, a small bed, and/or a waste disposal receptacle. As illustrated in FIG. 4, a wall of the multiple restroom stall 300 has a door 301. The door 301 is an automatic sliding door that closes and opens the entrance opening of the multipurpose restroom stall 300. A display panel 303 and an operation panel 304 are provided on the outer wall near the door 301. The display panel 303 may display information indicating whether the multipurpose restroom stall 300 is vacant or occupied. The display panel 303 also has the function of displaying information pursuant to a request sent from the server apparatus 100. The operation panel 304 is used to operate the door 301 to open and close it. The operation panel 304 has a switch(es) or a button(s) for opening and closing the door 301. The multipurpose restroom stall 300 is also provided with a locking and unlocking device 302 for locking and unlocking the door 301 in response to a manual operation conducted by the user or a request sent from the server apparatus 100.

The server apparatus 100 finds an intended user from among the users staying in the facility and forecasts whether the intended user thus found will go to a restroom area. The processing of finding an intended user and the processing of forecasting whether the intended user thus found will go to a restroom area are carried out based on images captured by the cameras 200. When it is forecast that an intended user will go to a restroom area in the facility, the server apparatus 100 reserves the multipurpose restroom stall 300 in the restroom area. Specifically, the server apparatus 100 locks the door 301 of the multipurpose restroom stall 300 while the intended user moves from his/her present location to the restroom area. When the intended user comes near the multipurpose restroom stall 300 (or arrives at the restroom area) after the door 301 is locked, the server apparatus 100 unlocks the door 301 of the multipurpose restroom stall 300.

(System Configuration)

The configuration of the restroom management system of this embodiment will be described with reference to FIG. 5. FIG. 5 is a block diagram schematically illustrating exemplary configurations of the server apparatus 100 and the multipurpose restroom stall 300 shown in FIGS. 1 to 4.

(Server Apparatus 100)

As described above, the server apparatus 100 is an information processing apparatus configured to forecast whether an intended user will go to a restroom area in the facility and reserve the multipurpose restroom stall 300. The server apparatus 100 may be constituted by a general-purpose computer. For example, the server apparatus 100 includes a processor, such as a CPU or a GPU, a main storage unit, such as a RAM or a ROM, and an auxiliary storage unit, such as an EPROM, a hard disk drive, or a removable medium. The removable medium may be a recording medium, such as a USB memory, a CD, or a DVD. The auxiliary storage unit stores an operating system (OS), programs, and tables. The processor executes a program(s) stored in the auxiliary storage unit to implement functions for achieving desired purposes that will be described later. Some or all the functions of the server apparatus 100 may be implemented by a hardware circuit(s), such as an ASIC or an FPGA.

As illustrated in FIG. 5, the server apparatus 100 of this embodiment includes a communication unit 101, a control unit 102, and a storage unit 103. The configuration of the server apparatus 100 is not limited to the configuration illustrated in FIG. 5, but some components may be eliminated, replaced by other components, or added.

The communication unit 101 connects the server apparatus 100 to a network. For example, the communication unit 101 communicates with the cameras 200 and the multipurpose restroom stall 300 via a network using a communication network, such as LAN (Local Area Network), WAN (Wide Area Network), or Wi-Fi (registered trademark).

The control unit 102 is constituted by a processor, such as a CPU and performs overall control of the server apparatus 100. The control unit 102 of this embodiment has, as functional modules, a forecast part 1022 and a reservation part 1023. The control unit 102 implements these functional modules by executing a program stored in the storage unit 103 by the processor.

The forecast part 1022 forecasts whether an intended user staying in the facility will go to a restroom area. In the process of forecasting whether an intended user will go to a restroom area, the forecast part 1022 firstly finds an intended user from among the users staying in the facility. The forecast part 1022 of this embodiment may analyze image data obtained by the cameras 200 to identify a user in a wheelchair, a user using a cane, a user accompanied by an infant, a pregnant user, an aged user, and a handicapped user as an intended user. The forecast part 1022 may find an intended user on the basis of the speeds of movement or the paths of movement of the users staying in the facility. For example, the forecast part 1022 may calculate the speeds of movement of the users from the changes in the locations of the users per unit time and identify a user whose speed of movement is lower than a predetermined threshold as an intended user. The forecast part may also identify a user whose path of movement includes a slope but does not include stairs as an intended user. The forecast part may identify a user who satisfies two or more of the above conditions as an intended user.

When an intended user is found in the facility, the forecast part 1022 forecasts whether the intended user will go to a restroom area. For example, the forecast part 1022 conducts time series analysis of image data obtained by the cameras 200 to determine the direction of movement of the intended user. Then, the forecast part 1022 compares the direction of movement of the intended user and map data about the interior of the facility to determine whether the direction of movement of the intended user is the direction toward a restroom area or not. If the direction of movement of the intended user is the direction toward a restroom area, the forecast part 1022 may determine that the intended user is moving toward the restroom area. Alternatively, the forecast part 1022 may determine whether the line of sight of the intended user is directed to a sign post indicating a restroom area by using image data obtained by the cameras 200. If it is determined that the line of sight of the intended user is directed to a sign post indicating a restroom area, the forecast part 1022 may determine that the intended user will go to a restroom area. If it is forecast that the intended user will go to a restroom area, the forecast part 1022 passes information for identifying the intended user (e.g. face recognition data) to the reservation part 1023. The face recognition data of the intended user may be generated from data of an image in which the intended user is present. In the case where there is a plurality of restroom areas in the facility, the forecast part 1022 may pass information identifying the restroom area to which the intended user is expected to go to the reservation part 1023 together with the face recognition data of the intended user.

The reservation part 1023 reserves the multipurpose restroom stall 300 on the basis of the information passed from the forecast part 1022. Specifically, the reservation part 1023 firstly determines whether the multipurpose restroom stall 300 in the restroom area to which the intended user will go is vacant (i.e. the multipurpose restroom stall 300 is not occupied by another user). This process of determination is carried out based on data stored in the storage unit 103, which will be described later.

If it is determined that the multipurpose restroom stall 300 in the restroom area to which the intended user will go is vacant, the reservation part 1023 reserves the multipurpose restroom stall 300. Specifically, the reservation part 1023 sends a command to lock the door 301 of the multipurpose restroom stall 300 (which will be referred to as "lock command") to the multipurpose restroom stall 300 through the communication unit 101. Then, the reservation part 1023 monitors the location of the intended user using the face recognition data of the intended user and image data obtained by the cameras 200. When arrival of the intended user at the restroom area is detected in this monitoring process, the reservation part 1023 sends a command to unlock the door 301 of the multipurpose restroom stall 300 (which will be referred to as "unlock command") to the multipurpose restroom stall 300 through the communication unit 101. The reservation part 1023 may also send a display command to the multipurpose restroom stall 300 together with the unlock command. The display command is a command for causing the display panel 303 to display an image (including text and/or illustration) that invites the intended user to use the multipurpose restroom stall 300. If the multipurpose restroom stall 300 is provided with a sound output device, such as a speaker, the server apparatus 100 may send a voice output command to the multipurpose restroom stall 300 instead of the display command. The voice output command is a command for causing the sound output device to output a voice that invites the intended user to use the multipurpose restroom stall 300.

If it is determined that the multipurpose restroom stall 300 in the restroom area to which the intended user will go is not vacant, the reservation part 1023 does not reserve the multipurpose restroom stall 300 in the restroom area. In this case, the intended user may wait in the restroom area until the multipurpose restroom stall 300 becomes usable or move to another restroom area. If the intended user moves to another restroom area, the forecast part 1022 may forecast a restroom area to which the intended user will go next and pass identification information of the forecast restroom area to the reservation part 1023. Then, the reservation part 1023 may reserve the multipurpose restroom stall 300 in the restroom area to which the intended user is forecast to go next.

There may be cases where the direction of movement of the intended user changes to a direction different from the direction toward the restroom area, while the reservation part 1023 is monitoring the location of the intended user, in other words, while the intended user is moving. For example, if the destination of the intended user is a shop near the restroom area, the direction of movement of the intended user may be the direction toward the restroom area firstly, but the intended user may change his/her direction of movement to a direction different from the direction toward the restroom area on his/her way to the destination. If the direction of movement of the intended user changes to a direction different from the direction toward the restroom area while the reservation part 1023 is monitoring the location of the intended user, the reservation part 1023 may cancel the reservation of the multipurpose restroom stall 300, in other words, unlock the door 301. Thus, the reservation of the multipurpose restroom stall 300 will not be continued needlessly.

The storage unit 103 stores various information. The storage unit 103 is constituted by a storage medium, such as a RAM, a magnetic disk, or a flash memory. The storage unit 103 stores various programs executed by the processor and various data. The programs stored in the storage unit 103 of this embodiment include an operating system and a program for performing the above described forecast processing and reservation processing. Moreover, a restroom management database 1031 is constructed in the storage unit 103 of this embodiment. The restroom management databases 1031 is constructed by managing data stored in an auxiliary storage unit by a database management system program (DBMS program) executed by the processor. The restroom management database 1031 is, for example, a relational database.

What is stored in the restroom management database 1031 is data relating to the restroom stalls provided in the restroom areas in the facility. An exemplary structure of data stored in the restroom management database 1031 will be described here with reference to FIG. 6. FIG. 6 illustrates an exemplary table structure of data stored in the restroom management database 1031. As illustrated in FIG. 6, the restroom management database 1031 stores restroom information tables for respective restroom areas. In other words, restroom information tables as many as the restroom areas in the facility are stored in the restroom management database 1031. Each restroom information table has the fields of area ID, multipurpose restroom stall, and ordinary restroom stalls. In this embodiment, it is assumed that each restroom area has one multipurpose restroom stall 300 and M ordinary restroom stalls. Therefore, each restroom information table has one multipurpose restroom stall field and M ordinary restroom stall fields.

What is stored in the area ID field is information (or area ID) for identifying each of the restroom areas in the facility. What is stored in the multipurpose restroom stall field is information indicating the usage status of the multipurpose restroom stall 300 in each restroom area. For example, if the multipurpose restroom stall 300 is vacant, the information "vacant" is stored in the multipurpose restroom stall field. If the multipurpose restroom stall 300 is being reserved, the information "reserved" is stored in the multipurpose restroom stall field. If the multipurpose restroom stall 300 is occupied, the information "occupied" is stored in the multipurpose restroom stall field. What is stored in the fields of ordinary restroom stall #1 to ordinary restroom stall #M is information indicating the usage status of the respective ordinary restroom stalls. For vacant ordinary restroom stalls, the information "vacant" is stored in the corresponding ordinary restroom fields. For occupied ordinary restroom stalls, the information "occupied" is stored in the corresponding ordinary restroom fields. Whether a multipurpose restroom stall or an ordinary restroom stall is vacant or occupied may be determined using a motion sensor provided in each restroom stall or on the basis of the locking status (locked or not) of the door of each restroom stall.

While FIG. 6 illustrates a case where there are a plurality of restroom areas in the facility, there may be a case where there is only one restroom area in the facility. In that case, only one restroom information table having a multipurpose restroom stall field and ordinary restroom stall fields is stored in the restroom management database 1031, as illustrated in FIG. 7.

The above-described restroom management database 1031 may be constructed in an external apparatus. In that case, the server apparatus 100 and the external apparatus may be connected through a network so that the server apparatus 100 can access the restroom management database 1031 when necessary.

Various processing executed by the server apparatus 100 configured as above may be executed by either hardware or software.

(Multipurpose Restroom Stall 300)

Next, the multipurpose restroom stall 300 will be described. As described previously, the multipurpose restroom stall 300 is a restroom stall provided with a space and equipment that intended users can use fitly. The multipurpose restroom stall 300 has a communication unit 305 and a control unit 306 in addition to the aforementioned locking and unlocking device 302, the display panel 303, and the operation panel 304.

The communication unit 305 has the same configuration as the communication unit 101 of the server apparatus 100 and communicates with the server apparatus 100 through the network.

The control unit 306 is constituted by, for example, a microcomputer and performs overall control of the multipurpose restroom stall 300. For example, when a user performs an operation for opening or closing the door 301 by the operation panel 304, the control unit 306 causes the door 301 to open or close.

The control unit 306 causes the display panel 303 to display information indicating the usage status of the multipurpose restroom stall 300. For example, when the multipurpose restroom stall 300 is being occupied or reserved, the control unit 306 causes the display panel 303 to display an image (including text and/or illustration) indicating that the multipurpose restroom stall 300 is occupied. When the multipurpose restroom stall 300 is vacant, the control unit 306 causes the display panel 303 to display an image (including text and/or illustration) indicating that the multipurpose restroom stall 300 is vacant.

As described above, whether the multipurpose restroom stall 300 is occupied or vacant may be determined based on a sensor signal of a motion sensor provided in the multipurpose restroom stall 300. Specifically, if the presence of a user in the multipurpose restroom stall 300 is detected by the motion sensor, it may be determined that the multipurpose restroom stall 300 is occupied. If the presence of a user in the multipurpose restroom stall 300 is not detected by the motion sensor, it may be determined that the multipurpose restroom stall 300 is vacant. Alternatively, whether the multipurpose restroom stall 300 is occupied or vacant may be determined based on locking and unlocking operations of the door 301 by users.

The control unit 306 also has the function of causing the display panel 303 to display an image (including text and/or illustration) that invites the intended user to use the multipurpose restroom stall 300, when the display command sent from the server apparatus 100 is received by the communication unit 305.

The control unit 306 has the function of controlling the locking and unlocking device in response to manual operations conducted by users. The control unit 306 also has the function of controlling the locking and unlocking device 302 in response to the lock command and the unlock command sent from the server apparatus 100.

The configuration and the function of the multipurpose restroom stall 300 are not limited to those described above, but some of its components and/or functions may be eliminated or replaced by other components and/or functions, or other components and/or other functions may be added.

(Process Performed by Server Apparatus)

A process performed by the server apparatus 100 of this embodiment will now be described with reference to FIG. 8. FIG. 8 is a flow chart of a process executed repeatedly by the server apparatus 100.

In the processing routine according to the flow chart of FIG. 8, the forecast part 1022 of the server apparatus 100 obtains image data captured by the cameras 200 (step S101). The forecast part 1022 analyzes the obtained image data to identify a user in a wheelchair, a user using a cane, a user accompanied by an infant, a pregnant user, an aged user, or a handicapped user as an intended user (step S102). If no intended user is found by this identification process, it is determined that there is no intended user in the facility (a negative determination in step S103). Then, the execution of this processing routine is ended this time. If an intended user is found by the above identification process, it is determined that there is an intended user in the facility (an affirmative answer in S103). Then, the processing of step S104 is executed next.

In step S104, the forecast part 1022 conducts time series analysis of image data obtained by the cameras 200 to determine the direction of movement of the intended user. Then, the forecast part 1022 determines whether the intended user is moving toward a restroom area on the basis of the determined direction of movement (step S105). Specifically, the forecast part 1022 compares the direction of movement determined in step S104 and map data about the interior of the facility to determine whether the direction of movement of the intended user is the direction toward a restroom area or not. If the direction of movement is not the direction toward a restroom area, the forecast part 1022 determines that the intended user is not moving toward the restroom area (a negative answer in step S105). Then, the execution of this processing routine is ended this time. If the direction of movement is the direction toward a restroom area, the forecast part 1022 determines that the intended user is moving toward the restroom area (an affirmative answer in step S105). Then, the forecast part 1022 generates face recognition data of the intended user using data of an image in which the intended user is present and passes the face recognition data thus generated to the reservation part 1023. In the case where there are a plurality of restroom areas in the facility, the forecast part 1022 determines the restroom area toward which the intended user is conjectured to be moving on the basis of the direction of movement of the intended user and the map data about the interior of the facility. The forecast part 1022 passes the area ID of the restroom area thus determined to the reservation part 1023 together with the face recognition data of the intended user.

The reservation part 1023 determines whether the multipurpose restroom stall 300 in the restroom area to which the intended user is conjectured to be moving is vacant (step S106). Specifically, the reservation part 1023 accesses the restroom information table in the restroom management database 1031 to determine whether the information "vacant" is stored in the multipurpose restroom stall field. In the case where there are a plurality of restroom areas in the facility, the reservation part 1023 accesses the restroom management database 1031 using the area ID passed from the forecast part 1022 as an argument to find the restroom information table associated with the area ID. Then, the reservation part 1023 determines whether the information "vacant" is stored in the multipurpose restroom stall field of the restroom information table thus found. If the information "occupied" or "reserved" is stored in the multipurpose restroom stall field, the reservation part 1023 determines that the multipurpose restroom stall 300 in the restroom area to which the intended user is conjectured to be moving is not vacant (a negative answer in step S106). Then, the execution of this processing routine is ended this time. If the information "vacant" is stored in the multipurpose restroom stall field, the reservation part 1023 determines that the multipurpose restroom stall 300 in the restroom area to which the intended user is conjectured to be moving is vacant (an affirmative answer in step S106). Then, the processing of step S107 is executed next.

In step S107, the reservation part 1023 sends a lock command to the vacant multipurpose restroom stall 300 through the communication unit 101 to reserve the multipurpose restroom stall 300. When the multipurpose restroom stall 300 receives the lock command, its control unit 306 controls the locking and unlocking device 302 to lock the door 301. After the door 301 is locked pursuant to the lock command sent from the server apparatus 100, the control unit 306 causes the display panel 303 to display information indicating that the multipurpose restroom stall 300 is occupied. This prevents the users other than the intended user from using the multipurpose restroom stall 300.

After reserving the multipurpose restroom stall 300 as above, the reservation part 1023 monitors the location of the intended user using the face recognition data of the intended user and the image data obtained by the cameras 200. The reservation part 1023 determines whether or not the direction of movement of the intended user changes to a direction different from the direction toward the restroom area while intended user is moving on the basis of the result of monitoring (step S108). If the direction of movement of the intended user changes to a direction different from the direction toward the restroom area (an affirmative answer in step S108), the reservation part 1023 cancels the reservation of the multipurpose restroom stall 300 (step S111). Specifically, the reservation part 1023 sends the unlock command to the multipurpose restroom stall 300 through the communication unit 101. When the multipurpose restroom stall 300 receives the unlock command, its control unit 306 controls the locking and unlocking device 302 to unlock the door 301. After the door 301 is unlocked pursuant to the unlock command sent from the server apparatus 100, the control unit 306 causes the display panel 303 to display information indicating that the multipurpose restroom stall 300 is vacant. Thus, the reservation of the multipurpose restroom stall 300 will not be continued needlessly. If the direction of movement of the intended user does not change to a direction different from the direction toward the restroom area (a negative answer in step S108), the processing of step S109 is executed next.

In step S109, the reservation part 1023 determines whether or not the intended user has arrived at the restroom area. This determination is made by comparing the location of the intended user determined by the aforementioned monitoring and the map data about the interior of the facility. Specifically, if the location of the intended user does not coincide with the location of the restroom area in the map data, the reservation part 1023 determines that the intended user has not arrived at the restroom area (a negative answer in step S109). Then, the processing of step S108 onward is executed again. If the location of the intended user coincides with the location of the restroom area in the map data, the reservation part 1023 determines that the intended user has arrived at the restroom area (an affirmative answer in step S109). Then, the processing of step S110 is executed next.

In step S110, the reservation part 1023 sends the lock command and the display command to the reserved multipurpose restroom stall 300 through the communication unit 101. When the multipurpose restroom stall 300 receives the unlock command and the display command, its control unit 306 firstly controls the locking and unlocking device 302 to unlock the door 301. After the door 301 is unlocked pursuant to the unlock command sent from the server apparatus 100, the control unit 306 causes the display panel 303 to display an image that invites the intended user to use the multipurpose restroom stall 300. In the case where the multipurpose restroom stall 300 receives the voice output command instead of the display command, the control unit 306 causes the sound output device (e.g. a speaker) to output a voice message that invites the intended user to use the multipurpose restroom stall 300. Thus, the intended user can use the multipurpose restroom stall 300 immediately without being mistaken.

As above, when it is forecast that the intended user will go to a restroom area, the multipurpose restroom stall 300 in that restroom area can be reserved automatically by the processing routine according to the flow chart of FIG. 8. This can prevent a user (e.g. an able-bodied user) who can use an ordinary restroom stall without difficulties from using the multipurpose restroom stall. Therefore, the intended user can use the multipurpose restroom stall 300 immediately when he or she arrives at the restroom area.

As above, the restroom management system of this embodiment can improve the convenience of use of the multipurpose restroom stall 300.

<First Modification>

While the restroom management system according to the above-described embodiment is configured to forecast whether the intended user will go to a restroom area using images captured by the cameras provided in the facility, the system may be modified to forecast whether the intended user will go to a restroom area by determining the direction of movement of the intended user by time-series analysis of the location information of the intended user and comparing the determined direction of movement and the map data about the interior of the facility. The location information of the intended user may be obtained by a terminal carried by the intended user (e.g. a cellular phone, a smartphone, or a wearable terminal) or a GPS (Global Positioning System) device provided in a wheelchair or cane used by the intended user.

<Second Modification>

While the restroom management system according to the above-described embodiment is configured to forecast whether the intended user will go to a restroom area using images captured by the cameras 200 provided in the facility, the system may be modified to forecast whether the intended user will go to a restroom area using data of voices of the intended user picked up by sound pickup devices provided at multiple locations in the facility. For example, if a sound pickup device picks up a speech of the intended user that tells to an accompanying person that the intended user will go to a restroom or asks a clerk of the facility the location of a restroom, the system may forecast that the intended user will go to a restroom area.

<Third Modification>

In the restroom management system according to the above-described embodiment, if there is a vacant multipurpose restroom stall 300 in the restroom area to which the intended user is moving, the system reserves the multipurpose restroom stall 300. The system may be modified not to reserve the multipurpose restroom stall 300, when there is no vacant ordinary restroom stall in the restroom area, even if the multipurpose restroom stall 300 is vacant. In other words, the restroom management system may be configured to reserve the multipurpose restroom stall 300, if there is a vacant multipurpose restroom stall 300 and a vacant ordinary restroom stall in the restroom area to which the intended user is moving. The system may determine whether there is a vacant multipurpose restroom stall 300 and a vacant ordinary restroom stall on the basis of the restroom information table associated with the restroom area to which the intended user is moving.

The restroom management system of this modification does not prevent other users who have urgent need to urinate or defecate from using the multipurpose restroom stall 300, when the restroom area to which the intended user is moving is crowded.

<Others>

The above embodiment and modifications have been described only by way of example. Modifications can be made to them without departing from the essence of this disclosure. For example, the processing performed by the server apparatus 100 may be performed partly or entirely by a terminal carried by the intended user. For example, the terminal carried by the intended user may perform the processing of forecasting whether the intended user will go to a restroom area and the processing of requesting the server apparatus 100 to reserve the multipurpose restroom stall 300. Only the processing of reserving the multipurpose restroom stall 300 (or unlocking and locking the door 301) may be performed by the server apparatus 100.

The processes and components that have been described in this disclosure may be employed in any combination so long as it is technically feasible to do so. For example, features of the embodiment and the first to third modifications may be employed in any feasible combination. One, some, or all of the processes that have been described as processes performed by one apparatus may be performed by a plurality of apparatuses in a distributed manner. One, some, or all of the processes that have been described as processes performed by different apparatuses may be performed by a single apparatus. The hardware configuration employed to implement various functions in a computer system may be modified flexibly.

The technology disclosed herein can be carried out by supplying a computer program(s) that implements the functions described in the above description of the embodiment to a computer to cause one or more processors of the computer to read and execute the program(s). Such a computer program(s) may be supplied to the computer by a computer readable, non-transitory storage medium that can be connected to a system bus of the computer, or through a network. The computer-readable, non-transitory storage medium refers to a recording medium that can store information, such as data and programs, electrically, magnetically, optically, mechanically, or chemically in such a way as to allow the computer or the like to read the stored information. Examples of such a recording medium include any type of disc media including a magnetic disc, such as a floppy disc (registered trademark) and a hard disk drive (HDD), and an optical disc, such as a CD-ROM, a DVD, and a Blu-ray disc. The recording medium may be other storage media, such as a read-only memory (ROM), a random access memory (RAM), an EPROM, an EEPROM, a magnetic card, a flash memory, an optical card, and a solid state drive (SSD).

What is claimed is:

1. An information processing apparatus comprising a controller including at least one processor, the controller being configured to execute the processing of:
   forecasting whether an intended user will go to a restroom area in a facility, the intended user being a user who is eligible for using a multipurpose restroom stall;
   when it is forecast that the intended user will go to the restroom area, reserving a multipurpose restroom stall provided in the restroom area;
   when it is forecast that the intended user will go to the restroom area, the controller reserves the multipurpose restroom stall by locking a door of the multipurpose restroom stall;
   when the intended user comes near the multipurpose restroom stall, the controller unlocks the door of the multipurpose restroom stall; and
   when the intended user comes near the multipurpose restroom stall, the controller causes the multipurpose restroom to output a voice message or an image that invites the intended user to use the multipurpose restroom stall,
   wherein when the restroom stalls in the restroom area other than the multipurpose restroom stall are occupied, the controller does not reserve the multipurpose restroom stall.

2. An information processing apparatus according to claim 1, wherein the controller is configured to forecast whether the intended user will go to the restroom area using location information of the intended user.

3. An information processing apparatus according to claim 1, wherein the controller is configured to forecast whether the intended user will go to the restroom area on the basis of an image captured by a camera configured to capture an image in the facility.

4. An information processing apparatus according to claim 1, wherein the controller is configured to forecast whether the intended user will go to the restroom area on the basis of sound picked up by a sound pickup device configured to pick up sound in the facility.

5. An information processing apparatus according to claim 1, wherein the intended user is a user in a wheelchair, a user using a cane, a user accompanied by an infant, a pregnant user, an aged user, or a handicapped user, and the controller is configured to find the intended user on the basis of an image captured by a camera configured to capture an image in the facility.

6. An information processing apparatus according to claim 1, wherein when unlocking the door of the multipurpose restroom stall, the controller executes the processing of inviting the intended user to use the multipurpose restroom stall.

7. An information processing apparatus according to claim 6, wherein the processing of inviting the intended user to use the multipurpose restroom stall comprises the processing of causing an output device provided for the multipurpose restroom stall to output a voice message that invites the intended user to use the multipurpose restroom stall.

8. An information processing apparatus according to claim 6, wherein the processing of inviting the intended user to use the multipurpose restroom stall comprises the processing of causing an output device provided for the multipurpose restroom stall to output an image that invites the intended user to use the multipurpose restroom stall.

9. An information processing method comprising the following steps of processing executed by a computer:
   a first step of forecasting whether an intended user will go to a restroom area in a facility, the intended user being a user who is eligible for using a multipurpose restroom stall;
   when it is forecast that the intended user will go to the restroom area, a second step of reserving a multipurpose restroom stall provided in the restroom area;
   when it is forecast that the intended user will go to the restroom area, the computer reserves the multipurpose restroom stall by locking a door of the multipurpose restroom stall;
   when the intended user comes near the multipurpose restroom stall, the computer unlocks the door of the multipurpose restroom stall; and
   when the intended user comes near the multipurpose restroom stall, the computer causes the multipurpose restroom to output a voice message or an image that invites the intended user to use the multipurpose restroom stall, wherein when the restroom stalls in the restroom area other than the multipurpose restroom stall are occupied, the computer does not reserve the multipurpose restroom stall.

10. An information processing method according to claim 9, wherein in the first step, the computer forecasts whether the intended user will go to the restroom area using location information of the intended user.

11. An information processing method according to claim 9, wherein in the first step, the computer forecasts whether the intended user will go to the restroom area on the basis of an image captured by a camera configured to capture an image in the facility.

12. An information processing method according to claim 9, wherein in the first step, the computer forecasts whether the intended user will go to the restroom area on the basis of sound picked up by a sound pickup device configured to pick up sound in the facility.

13. An information processing method according to claim 9, wherein the intended user is a user in a wheelchair, a user using a cane, a user accompanied by an infant, a pregnant user, an aged user, or a handicapped user, and in the first step, the computer finds the intended user on the basis of an image captured by a camera configured to capture an image in the facility.

14. A non-transitory computer readable storage medium storing an information processing program, which when executed by a computer processor, performs the steps of:

a first step of forecasting whether an intended user will go to a restroom area in a facility, the intended user being a user who is eligible for using a multipurpose restroom stall;

when it is forecast that the intended user will go to the restroom area, a second step of reserving a multipurpose restroom stall provided in the restroom area;

when it is forecast that the intended user will go to the restroom area, the computer processor reserves the multipurpose restroom stall by locking a door of the multipurpose restroom stall;

when the intended user comes near the multipurpose restroom stall, the computer processor unlocks the door of the multipurpose restroom stall; and when the intended user comes near the multipurpose restroom stall, the computer processor causes the multipurpose restroom to output a voice message or an image that invites the intended user to use the multipurpose restroom stall, wherein when the restroom stalls in the restroom area other than the multipurpose restroom stall are occupied, the computer processor does not reserve the multipurpose restroom stall.

* * * * *